Figure 1:
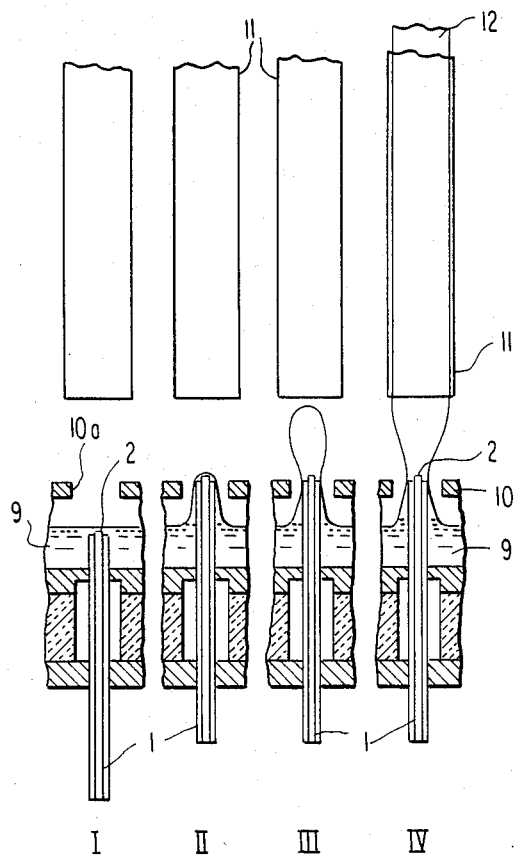

United States Patent [19]

Pavlovi et al.

[11] Patent Number: 4,526,602
[45] Date of Patent: Jul. 2, 1985

[54] EQUIPMENT AND METHOD FOR MANUFACTURING THIN GLASS FLAKES

[76] Inventors: Pavao Pavlovi, Koparska 54; Branko Gnjidi, Titogradska 15, both of 52000 Pula, Yugoslavia

[21] Appl. No.: 501,452

[22] Filed: Jun. 6, 1983

[51] Int. Cl.³ .............................................. C03B 9/03
[52] U.S. Cl. .......................................... 65/81; 65/88; 65/89; 65/190; 65/192; 65/296; 65/300
[58] Field of Search ............... 65/81, 82, 88, 89, 184, 65/192, 190, 268, 296, 300

[56] References Cited

U.S. PATENT DOCUMENTS

| | | | |
|---|---|---|---|
| 2,711,055 | 6/1955 | Majkrzak et al. | 65/300 X |
| 3,342,248 | 9/1967 | Bonis et al. | 65/192 X |
| 3,729,301 | 4/1973 | Heaton et al. | 65/184 X |
| 3,734,704 | 5/1973 | Fike | 65/184 X |
| 4,066,428 | 1/1978 | Günthner | 65/81 X |

FOREIGN PATENT DOCUMENTS 56283 4/1891 Fed. Rep. of Germany ........ 65/300

Primary Examiner—Robert Lindsay
Attorney, Agent, or Firm—Beveridge, DeGrandi & Weilacher

[57] ABSTRACT

A blow-pipe 1 with an upper end 2 shaped to retain a working amount of molten glass is vertically movable from beneath the surface of molten glass 9 in a furnace to an upper position within orifice 10a of cover plate 10 and just below a cylindrical guide tube 11. Upward movement brings the blow-pipe generally into a hotter environment, expands the internal air and thus provides an initial bubble at the blow-pipe end. This is progressively expanded into the guide tube, preferably by two-stage air supply at different pressures, to produce a constrained glass bubble, of a few microns thickness.

9 Claims, 2 Drawing Figures

U.S. Patent  Jul. 2, 1985  4,526,602

EQUIPMENT AND METHOD FOR MANUFACTURING THIN GLASS FLAKES

This invention relates to equipment for manufacturing thin glass flakes and to a method of manufacturing said flakes using the equipment. The foils so manufactured are typically of a few microns thickness, and are useful in the electrical and allied industries.

In one aspect the invention provides equipment for manufacturing thin glass flakes, comprising a furnace for holding a layer of molten glass; an orificed furnace cover plate; a vertical cylindrical holding tube, placed above the orifice, and open at its lower end; and a vertical blowpipe slidable in the base of the furnace, coaxially with the holding tube, the blow pipe being movable from its lower portion where its top is below the level of molten glass to the upper position where its top is stopped generally within the furnace cover plate orifice, the blow-pipe upper end being adapted to hold a working amount of molten glass during its upward movement: whereby when the blow-pipe is moved upwards, thermal expansion of the air within the blow-pipe takes place to produce an initial bubble of glass at the blow-pipe upper end for subsequent expansion into the holding tube by air supply to the blow-pipe.

Preferably, the blow-pipe slides in a thermally insulated base construction of the furnace. This may be achieved by providing a furnace in which a thermally insulated base construction comprises a thermally insulating layer between a furnace base plate and an outermost plate, and the blow-pipe slides within a metal sealing sleeve in the base plate and a suitable orifice in the outermost plate. In such a case the blow-pipe may be spaced from the thermally insulating layer. It is helpful moreover if the diameter of the blow-pipe is of greater dimension than the blow-pipe nozzle diameter. All of these features assist in providing a useful temperature differential on a suitable body of enclosed air within the blowpipe, so that initial bubble formation is readily achieved.

The blow-pipe itself constitutes another aspect of the invention. Many different configurations of blow-pipe top are possible. For example, the blow-pipe top may a glass-collecting groove around the blow-pipe nozzle outlet. Alternatively, or additionally it may have a divergent nozzle outlet to assist in initial glass-collection.

A method of manufacturing glass flakes, using such equipment typically comprises a number of steps, such as:

(i) positioning the blow-pipe at a lower position at which its top is completely beneath the level of molten glass, (ii) sliding the blow-pipe vertically upwards to an upper position at which its top lies generally within the furnace cover plate orifice, and the blow-pipe upper portion lies generally within the molten glass whereby thermal expansion of air within the blow-pipe causes formation of an initial bubble within the retained molten glass at the blow-pipe top, (iii) applying air to the blow-pipe whereby the initial bubble is increased in size and enters the holding tube to form a constrained part cylindrical bubble, (iv) further applying air to the blow-pipe whereby the constrained part cylindrical bubble is increased in size until all of the collected amount of molten glass at the blow-pipe top is used up, and (v) discontinuing the supply of air, withdrawing the blow-pipe beneath the surface of the molten glass in the furnace, and removing the expanded part cylindrical bubble from the guide tube.

It is much preferred to operate by procedures in which stage (iii) is continued until the length of the constrained cylindrical portion of the bubble is from 1.0 to 1.5 times its diameter, and in which stage (iv) is carried out at a higher applied air pressure than stage (iii).

Figure 2:
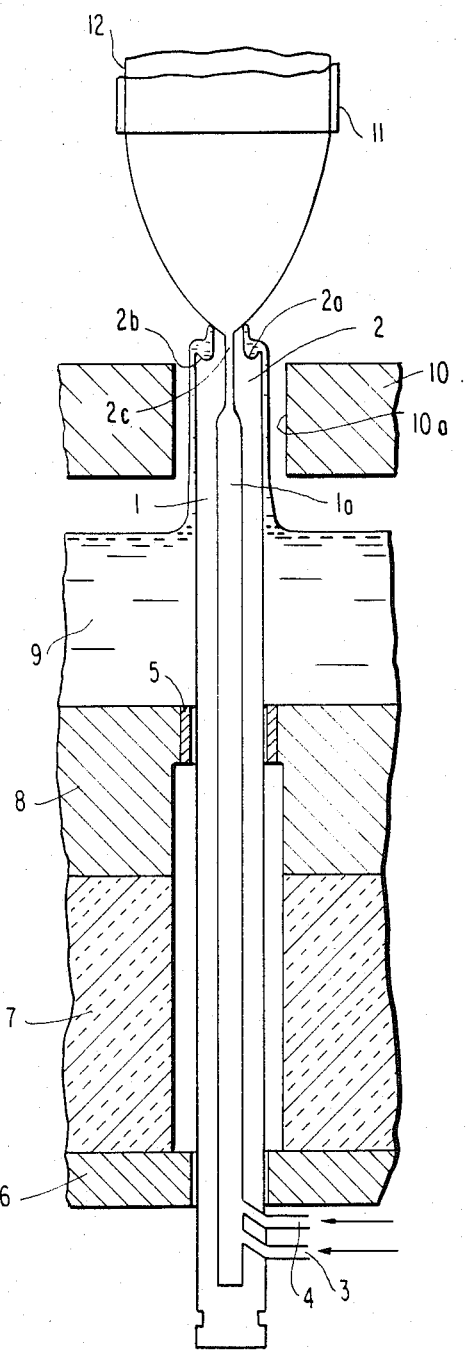

The invention will be further described with reference to the accompanying drawings, in which:

FIG. 1 shows the major components of the equipment in the configuration adopted in four consecutive operating steps designated as I, II, III and IV, FIG. 2 is an enlarged vertical cross-section that shows detailed features of the equipment of FIG. 1.

A blow-pipe 1 possesses an upper end portion 2 adapted to collect a working amount of molten glass. In the example given, the end portion 2 comprises a deep dosing groove 2a in the blow-pipe end wall and an inwardly tapered outlet recess 2b so that the nozzle outlet of the blow-pipe outlet outlet is divergent. Other configurations are possible provided with some form of temporary reservoir. Below the top recess 2b of blow-pipe 1 is a nozzle 2c communicating with a larger diameter central duct 1a of the blow-pipe 1.

The central duct 1a communicates with inlet 3 for primary compressed air and inlet 4 for secondary compressed air.

The blow-pipe 1 is vertically movable and slides in platinum sleeve 5 and in plate 6. Between sleeve 5 and plate 6 and surrounding but spaced from blow-pipe 1 are insulating layer 7 and furnace bottom plate 8 surrounding the blow pipe 1 with certain clearance.

The furnace comprises a layer of molten glass 9 and a furnace top cover plate 10 having an orifice 10a through which, at the top of its vertical movement, the blow-pipe 1 can protrude at a suitable clearance with plate 10. Vertically above orifice 10a is a cylindrical holding tube 11 open at its lower end.

The first stage in the use of such equipment is shown at FIG. 1 stage I. The blow-pipe end 2 lies beneath the top level of molten glass 9. In stage II the blow-pipe slides vertically upwards, carrying with it an amount of molten glass at its top 2, held in and around dosing groove 2a and in recess 2b, until it protrudes through orifice 10a. At this stage the blow-pipe stem has moved from its lower position in which it was spaced from the thermally insulating layer 7 and it comes to direct contact with molten glass layer 9. This causes expansion of and trapper air within duct 1a which in turn leads to an initial bubble formation at end portion 2.

In stage III primary compressed air is applied to the inlet 3 of the blow-pipe, increasing the size of this initial bubble pushing it upwards towards the vertical tube 11, and is constrained to expand and to form a confined thin wall glass cylinder 12. This is continued until the confined cylindrical bubble length achieves a value from one to one and a half times the cylinder diameter. Then, at stage IV, secondary compressed air is applied to the inlet 4 of the blow pipe 1 at higher pressure until all the total amount of the collected glass at the shaped top 2 of the blow pipe 1 is drawn into the expanding glass cylinder 2. At this point air supply is discontinued, the blow-pipe 1 is reset with its top 2 beneath the molten glass, and the formed glass cylinder 12, of very low wall thickness (of the order of a few microns) is is withdrawn from holding tube 11 applying vacuum. A new cycle is then initiated. Thin wall glass cylinder is then crushed to form thin glass flakes.

Thin glass flakes produced in this way can be used in electrical and like industry.

We claim:

1. Equipment for manufacturing thin glass cylinders to obtain thin glass flakes, comprising a furnace for holding a layer of molten glass; an orificed furnace cover plate; a vertical cylindrical holding tube, above the orifice, open at its lower end; and a vertical blow-pipe slidable in the base of the furnace, coaxially with the holding tube, the blow-pipe being movable through the molten glass between a lower position where the top of said tube is below the level of molten glass and an upper position where the top of said tube is located generally within the furnace cover plate orifice, the top of said blow-pipe being adapted to collect a working amount of molten glass during its upward movement through the molten glass, whereby when the blow-pipe is moved upwards, thermal expansion of the air enclosed within the blow-pipe takes place, thereby producing an initial bubble of glass at the top of said blow-pipe the initial glass bubble being enlarged in size and pushed upwards by a subsequent expansion into the holding tube when compressed air is supplied to the blow-pipe, forming a free standing wall glass cylinder.

2. Equipment as claimed in claim 1 in which the blow-pipe in a thermally insulated base construction of the furnace.

3. Equipment as claimed in claim 2, in which the thermally insulated furnace base construction comprises a thermally insulating layer between a furnace base plate and an outermost plate, and the blow-pipe slides within a metal sealing sleeve in the furnace base plate and within a suitable orifice in the outermost plate.

4. Equipment as claimed in claim 3 in which the blow-pipe is spaced from the thermally insulating layer.

5. Equipment as claimed in claim 2, 3 or 4, in which said blow-pipe has a central duct of greater diameter than the nozzle outlet diameter thereof.

6. Equipment as claimed in any one preceding claim in which the blow-pipe has an upper end face including a glass-collecting and dosing groove around the blow-pipe nozzle outlet.

7. Equipment as claimed in any one preceding claim in which the blow-pipe has a divergent nozzle oulet to assist in initial glass-collection.

8. A method of manufacturing thin glass flakes, comprising the steps of:
 (i) positioning the blow-pipe means at a lower position where the top of said means is completely beneath the level of molten glass
 (ii) sliding said blow-pipe means vertically upwards to an upper position at which the top of said means lies generally within a furnace cover plate orifice means, and said blow-pipe means lies generally within the molten glass whereby thermal expansion of air enclosed within said blow-pipe means causes formation of an initial glass bubble on the surface of collected molten glass at the top of said blow-pipe,
 (iii) applying compressed air to said blow-pipe means whereby the initial glass bubble is increased in size and is pushed upwards to form a constrained part-cylindrical glass bubble,
 (iv) further applying compressed air to said blow-pipe means whereby the constrained part-cylindrical bubble is increased in size forming a thin wall glass cylinder which expands freely upwards through a holding tube means without being pressed against its wall until all of the collected molten glass at the top of said blow-pipe means is used up, discontinuing the supply of air, withdrawing said blow-pipe means beneath the surface of the molten glass in the furnace, and removing the expanded thin glass cylinder from the holding tube means, and crushing the glass cylinder to obtain thin glass flakes.

9. A method as claimed in claim 8, in which (iii) is continued until the length of the constrained cylindrical portion of the glass bubble is from 1.0 to 1.5 times its diameter, and in which (iv) is carried out at a higher applied air pressure than (iii).

* * * * *